(12) United States Patent
Tanaka et al.

(10) Patent No.: US 6,438,480 B2
(45) Date of Patent: Aug. 20, 2002

(54) DEVICE FOR CHANGING THE SPEEDS OF THE FRONT AND REAR WHEELS IN A FOUR-WHEEL-DRIVE VEHICLE

(75) Inventors: Hirohisa Tanaka, 1-15-3, Ookayama, Meguro-ku, Tokyo; Hidetaka Koga, Kanagawa, both of (JP)

(73) Assignees: Isuzu Motors Limited; Hirohisa Tanaka, both of Tokyo (JP)

( * ) Notice: Subject to any disclaimer, the term of this patent is extended or adjusted under 35 U.S.C. 154(b) by 0 days.

(21) Appl. No.: 09/865,695

(22) Filed: May 29, 2001

(30) Foreign Application Priority Data

May 31, 2000 (JP) ........................................ 2000-162050

(51) Int. Cl.$^7$ .............................................. F16H 15/38
(52) U.S. Cl. ............................. 701/69; 701/75; 701/79; 180/411
(58) Field of Search .............................. 701/69, 74, 75, 701/79, 88; 477/43, 46; 180/411, 416

(56) References Cited

U.S. PATENT DOCUMENTS

| | | | | |
|---|---|---|---|---|
| 4,846,298 A | * | 7/1989 | Naito | 180/233 |
| 5,279,384 A | * | 1/1994 | Shibahata et al. | 180/248 |
| 5,982,279 A | * | 11/1999 | Tominaga et al. | 340/442 |

\* cited by examiner

*Primary Examiner*—Tan Nguyen
(74) *Attorney, Agent, or Firm*—Antonelli, Terry, Stout & Kraus, LLP

(57) ABSTRACT

A device for changing the speeds of the front and rear wheels in a four-wheel-drive vehicle, which is equipped with a continuously variable speed-changing mechanism for the front wheels which changes the input rotational speed and outputs it to the front wheel drive shafts and a continuously variable speed-changing mechanism for the rear wheels which changes the input rotational speed and outputs it to the rear wheel drive shafts. The device for changing the speeds of the front and rear wheels comprises a detector means for detecting the operation conditions of the vehicle and a controller for variably controlling the speeds of said continuously variable speed-changing mechanism for the front wheels and of said continuously variable speed-changing mechanism for the rear wheels based on the operation conditions of the vehicle detected by said detector means. The controller calculates a tire diameter ratio of the front wheels to the rear wheels when the vehicle travels straight, sets a target speed-changing ratio obtained based on the vehicle operation conditions detected by the detector means to be a target speed-changing ratio for the rear wheels in the continuously variable speed-changing mechanism for the rear wheels or to be a target speed-changing ratio for the front wheels in the continuously variable speed-changing mechanism for the front wheels, and sets a speed-changing ratio obtained by correcting the target speed-changing ratio based on the tire diameter ratio to be a target speed-changing ratio for the front wheels or to be a target speed-changing ratio for the rear wheels.

10 Claims, 4 Drawing Sheets

CHANGE IN THE SPEED — CHANGING RATIO
FOR THE TILTING ANGLE $\phi r$ OF POWER
ROLLERS ON THE REAR WHEEL SIDE DEVIATION OF THE RATIO (ef/er)
OF THE SPEED — CHANGING RATIOS

DEVICE FOR CHANGING THE SPEEDS OF THE FRONT AND REAR WHEELS IN A FOUR-WHEEL-DRIVE VEHICLE

FIELD OF THE INVENTION

The present invention relates to a continuously variable speed-changing device and, more particularly, to a device for changing the speeds of the front and rear wheels in a four-wheel-drive vehicle, capable of variably driving the front wheels and the rear wheels independently from each other by using a toroidal type continuously variable speed-changing device or a belt-type continuously variable speed-changing device.

DESCRIPTION OF THE PRIOR ART

There has heretofore been proposed a four-wheel-drive vehicle equipped with a continuously variable speed-changing mechanism for the front wheels and with a continuously variable speed-changing mechanism for the rear wheels in order to variably drive the front wheel drive shafts and the rear wheel drive shafts independently from each other via the continuously variable speed-changing mechanisms, in an attempt to decrease the weight of the four-wheel-drive mechanisms, to avoid the loss of power and to improve the fuel efficiency.

A typical example of the continuously variable speed-changing device in the four-wheel-drive vehicle can be typified by a toroidal type continuously variable speed-changing device disclosed in Japanese Laid-open Patent Publication (Kokai) No. 157151/1993 (JP-A 5-157151). This continuously variable speed-changing device includes an input shaft supported by a casing, and a continuously variable speed-changing mechanism for the front wheels and a continuously variable speed-changing mechanism for the rear wheels that are arranged, spaced apart, in the axial direction of the input shaft. The continuously variable speed-changing mechanism for the front wheels changes the input rotational speed of the input shaft and outputs it to the front wheel drive shafts. The continuously variable speed-changing mechanism for the rear wheels changes the input rotational speed of the input shaft and outputs it to the rear wheel drive shafts. These continuously variable speed-changing mechanisms have been so constituted as to variably drive the front wheels and the rear wheels independently from each other.

The above continuously variable speed-changing mechanism for the front wheels has substantially the same constitution as that of the continuously variable speed-changing mechanism for the rear wheels. Therefore, the constitution of the continuously variable speed-changing mechanism for the front wheels will now be briefly described. The continuously variable speed-changing mechanism for the front wheels includes an input disk which is secured to the input shaft and has one surface in the axial direction thereof formed as an input side recessed surface of an arcuate shape in cross section, and an output disk having one surface in the axial direction thereof formed as an output side recessed surface of an arcuate shape in cross section. The output disk is so disposed as to rotate relative to the input shaft and to surround the outer peripheral surface of the input shaft and has its output side recessed surface disposed so as to be opposed to the input side recessed surface of the input disk in the axial direction. A pair of power rollers are disposed between the input side recessed surface of the input disk and the output side recessed surface of the output disk so as to rotate relative to the input disk and the output disk. The power rollers are supported by trunnions so as to rotate. The axes of rotation of the power rollers are arranged at right angles with the axes of the trunnions that will be described later.

The trunnions are so supported as to rotate about their axes relative to the casing and to move in the axial direction. The axes of the trunnions extend in parallel with each other in the tangential direction relative to the input shaft at symmetrical positions with the input shaft interposed therebetween at an equal distance. On the cross sections of the input disk and of the output disk opposed to each other in the axial direction, the center of arc of the input side recessed surface of the input disk and the center of arc of the output side recessed surface of the output disk are arranged on a common center of arc. Further, the axial centers of the trunnions are arranged to be in agreement with the centers of the corresponding arcs. The axes of the trunnions define tilting axes along which the corresponding power rollers rotate. The power rollers are so constituted as to possess spherically protruded surfaces in the peripheries thereof, the protruded surfaces being brought into a pressed contact (point contact) with the input side recessed surface of the input disk and with the output side recessed surface of the output disk. The trunnions are moved in the axial directions but in the opposite directions relative to each other by the actuators such as hydraulic cylinders, whereby the power rollers rotate about the axes which are tilted by an angle corresponding to the amount of motion of the trunnions and changing of the speed between the input disk and the output disk is performed. According to the toroidal type continuously variable speed-changing device as described above, the rotational forces of the output disks of the continuously variable speed-changing mechanism for the front wheels and of the continuously variable speed-changing mechanism for the rear wheels are output to the front wheels and to the rear wheels independently from each other, to execute the full-time four-wheel drive. Constitutions of trunnions of the toroidal type continuously variable speed-changing device have been disclosed in, for example, Japanese Utility Model Publication (Kokoku) No. 11425/1994 and Japanese Laid-open Patent Publication (Kokai) No. 269039/1997 (JP-A 9-269039).

In the continuously variable speed-changing device, when a steering angle is given to the front wheels, the tilting angle of the power rollers of the continuously variable speed-changing mechanism for the front wheels is differed from the tilting angle of the power rollers of the continuously variable speed-changing mechanism for the rear wheels to drive the four wheels with little loss of power while absorbing the difference in rotational speed between the front wheels and the rear wheels when the vehicle turns, without using the center differential.

Another typical example of the continuously variable speed-changing device can be represented by a belt-type continuously variable speed-changing device. This continuously variable speed-changing device employs a belt-type continuously variable speed-changing mechanism for the front wheels and a belt-type continuously variable speed-changing mechanism for the rear wheels instead of the above-mentioned toroidal type continuously variable speed-changing mechanism for the front wheels and the toroidal type continuously variable speed-changing mechanism for the rear wheels. Each of the belt-type continuously variable speed-changing mechanism for the front wheels and the belt-type continuously variable speed-changing mechanism for the rear wheels comprises a primary pulley having a pulley fixed to the primary shaft drive-coupled to the output shaft of the engine and a movable pulley which is opposed to the fixed pulley and can move in the axial direction, a secondary pulley having a pulley fixed to the secondary shaft and a movable pulley which is opposed to the fixed pulley and can move in the axial direction, and a drive belt wrapped round the primary pulley and the secondary pulley. Upon changing the gaps of the pulley grooves of the primary pulley and of the secondary pulley, the belt-wrapping diameters of the pulleys change and the speed-changing ratio between the primary shaft and the secondary shaft is continuously adjusted. Even by using the thus constituted belt-type continuously variable speed-changing device, the front wheels and the rear wheels can be variably driven independently from each other by the continuously variable speed-changing mechanism for the front wheels and by the continuously variable speed-changing mechanism for the rear wheels in substantially the same manner as in the above-mentioned toroidal type continuously variable speed-changing device.

In the four-wheel-drive vehicle, part of the tire diameters of the wheels often changes not only when a temporary tire is used but also when the tire pneumatic pressure is decreased, the tire pneumatic pressures have not been well adjusted and tread surfaces are worn out. A change in the tire diameter of either the right wheel or the left wheel appears as a change in the average tire diameter of the right and left wheels for the front wheel drive shafts or for the rear wheel drive shafts, since differentials are provided for the front wheel drive shafts and for the rear wheel drive shafts, respectively. When a difference occurs in the tire diameter between the front wheels and the rear wheels, on the other hand, there results inconvenience such as loss of power due to a difference in the rotational speed between the front and rear drive systems, impairing smooth four-wheel-drive traveling. Therefore, this inconvenience must be avoided.

In the case where a difference occurs in the tire diameter between the front wheels and the rear wheels as described above, if the speed-changing ratio for the front and rear wheels is so set that the front wheel drive shafts and the rear wheel drive shafts run at an equal rotational speed, unequal tire diameters of the front and rear wheels turn out to be a difference in the peripheral velocity of the front and rear wheel tires when traveling straight, causing inconvenience such as loss of power. When the tire diameters of the front and rear wheels are not the same, therefore, it is desired to avoid inconvenience such as loss of power ascribed to unequal tire diameters by changing the speed-changing ratios for the wheels so that all of the wheels have an equal peripheral velocity, by utilizing the fact that the speed changing ratios for the front and rear wheels can be independently controlled. The conventional toroidal type continuously variable speed-changing device described earlier is so constructed to allow to carry out the four-wheel-drive with little loss of power while absorbing the difference in the peripheral speed between the front wheels and the rear wheels during turning without using the center differential by imparting a difference to the speed between the front wheels and the rear wheels when the vehicle turns. However, no means has yet been proposed for solving the problem for the case where a difference exists in the tire diameters between the front wheels and the rear wheels. Inconvenience such as loss of power due to unequal tire diameters of the front and rear wheels is possible to occur not only in the above-mentioned conventional toroidal type continuously variable speed-changing device but also in the above-mentioned belt-type continuously variable speed-changing device. Therefore, it is necessary to provide a means for solving the problem.

SUMMARY OF THE INVENTION

It is an object of the present invention to provide a novel device for changing the speeds of the front and rear wheels in a four-wheel-drive vehicle, which prevents the occurrence of inconvenience such as loss of power caused by a difference in the tire diameters between the front wheels and the rear wheels and ensures smooth four-wheel-drive traveling.

Another object of the present invention is to provide a novel device for changing the speeds of the front and rear wheels in a four-wheel-drive vehicle, which avoids the inconvenience such as loss of power and ensures smooth four-wheel-drive traveling, by detecting changes in the tire diameters of the front wheels and the rear wheels during traveling straight and, when differences in the tire diameters of the front and rear wheels are detected, separately controlling the speed-changing ratios for the front and rear wheels according to the differences such that the front and rear wheels will assume the same peripheral velocity.

A further object of the present invention is to provide a novel device for changing the speeds of the front and rear wheels in a four-wheel-drive vehicle, which avoids inconvenience such as loss of power caused by a difference in the tire diameters between the front wheels and the rear wheels and ensures smooth four-wheel-drive traveling, by effecting a relatively simple control operation.

According to the present invention, there is provided a device for changing the speeds of the front and rear wheels in a four-wheel-drive vehicle, which is equipped with a continuously variable speed-changing mechanism for the front wheels which changes the input rotational speed and outputs it to the front wheel drive shafts and a continuously variable speed-changing mechanism for the rear wheels which changes the input rotational speed and outputs it to the rear wheel drive shafts, so that the front wheels and the rear wheels can be driven at continuously variable speeds independently of each other owing to the continuously variable speed-changing mechanisms, wherein:

the device for changing the speeds of the front and rear wheels comprising a detector means for detecting the operation conditions of the vehicle and a controller for variably controlling the speeds of said continuously variable speed-changing mechanism for the front wheels and of said continuously variable speed-changing mechanism for the rear wheels based on the operation conditions of the vehicle detected by said detector means; and the controller calculates a tire diameter ratio of the front wheels to the rear wheels during the vehicle travels straight, sets a target speed-changing ratio obtained based on the vehicle operation conditions detected by the detector means to be a target speed-changing ratio for the rear wheels in the continuously variable speed-changing mechanism for the rear wheels or to be a target speed-changing ratio for the front wheels in the continuously variable speed-changing mechanism for the front wheels, and sets a speed-changing ratio obtained by correcting the target speed-changing ratio based on the tire diameter ratio to be a target speed-changing ratio for the front wheels or to be a target speed-changing ratio for the rear wheels.

It is desired that a driving force disconnection device is provided to disconnect the driving force transmitted to the front wheels from the continuously variable speed-changing mechanism for the front wheels or to disconnect the driving force transmitted to the rear wheels from the continuously variable speed-changing mechanism for the rear wheels, and the controller calculates the tire diameter ratio in a state where the driving force disconnection device is disconnected.

It is desired that the controller calculates the tire diameter ratio from a ratio of the rotational speed of the front wheel drive shafts to the rotational speed of the rear wheel drive shafts.

It is desired that the controller sets the speed-changing ratio obtained by correcting the target speed-changing ratio according to a predetermined equation by using the target speed-changing ratio and the tire diameter ratio as variables to be a target speed-changing ratio for the front wheels or a target speed-changing ratio for the rear wheels.

It is desired that the controller obtains the target speed-changing ratio for the front wheels or the target speed-changing ratio for the rear wheels by adding an amount for correcting the speed-changing ratio calculated based on the tire diameter ratio to the target speed-changing ratio.

It is desired that the controller calculates the amount for correcting the speed-changing ratio in compliance with a predetermined equation or an approximate equation using the tire diameter ratio as a variable.

It is desired that the controller obtains the amount for correcting the speed-changing ratio from a map prepared in advance based on the values calculated or approximated by a predetermined equation or an approximate equation determined in advance by using the tire diameter ratio as a variable.

It is desired that the controller obtains an approximate amount for correcting the speed-changing ratio calculated by a predetermined approximate equation using the tire diameter ratio as a variable, from a map prepared in advance based on the approximate values which have been further corrected based on a deviation of the ratio between the target speed-changing ratio for the front wheels and the target speed-changing ratio for the rear wheels at said tire diameter ratio.

It is desired that each of the continuously variable speed-changing mechanism for the front wheels and the continuously variable speed-changing mechanism for the rear wheels is constituted by a toroidal type continuously variable speed-changing device comprising an input disk for receiving a driving force, an output disk that is disposed opposite to the input disk and is drive-coupled to the front wheel drive shafts or to the rear wheel drive shafts, and power rollers disposed between the input disk and the output disk so as to rotate in a tilted manner and to change contact points to the input disk and to the output disk to continuously change the rotational speed of the input disk and to transmit the rotation to the output disk.

It is desired that the controller sets a target tilting angle of the power rollers for the front wheels in the continuously variable speed-changing mechanism for the front wheels and a target tilting angle of the power rollers for the rear wheels in the continuously variable speed-changing mechanism for the rear wheels, respectively, correspondingly to the target speed-changing ratio for the front wheels and the target speed-changing ratio for the rear wheels, to control the continuously variable speed-changing mechanism for the front wheels and the continuously variable speed-changing mechanism for the rear wheels based on the target tilting angle for the front wheels and the target tilting angle for the rear wheels.

DESCRIPTION OF THE PREFERRED EMBODIMENTS

Figure 1:
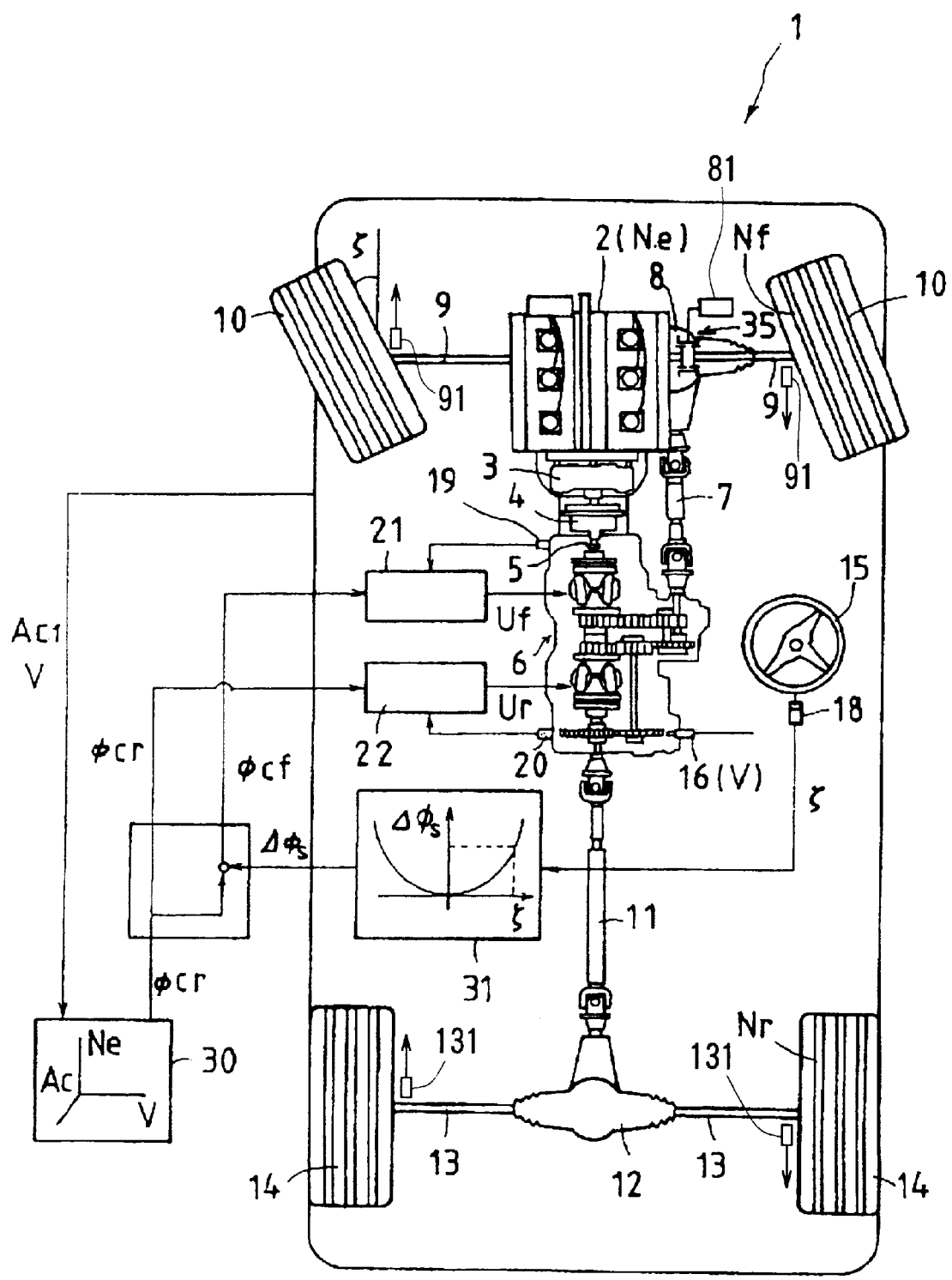
FIG. 1 is a plan view schematically illustrating a four-wheel-drive vehicle equipped with a device for changing the speeds of the front and rear wheels.

Embodiments of the device for changing the speeds of the front and rear wheels in a four-wheel-drive vehicle according to the invention will now be described with reference to the accompanying drawings. Referring to FIG. 1, a four-wheel-drive vehicle 1 equipped with a device for changing the speeds of the front and rear wheels according to the present invention is provided with an engine 2, a torque converter 3 on the output side of the engine, a clutch unit 4 at the back of the torque converter 3, and a double-cavity toroidal type continuously variable speed-changing device 6 arranged on the main shaft 5 on the output side of the clutch unit 4. The continuously variable speed-changing device 6 will be described later. The clutch unit 4 is constituted by a planetary gear which can be changed to the forward and reverse, and is equipped with a ring gear, a carrier and a clutch capable of being selectively coupled to the casing. Part of the driving force output from the continuously variable speed-changing device 6 is transmitted to a propeller shaft 7 for driving the front wheels, a differential 8 for the front wheels connected to the propeller shaft 7 for driving the front wheels, right and left front wheel drive shafts 9,9 on the output side of the differential 8 for the front wheels and the front wheels 10,10 attached to the front wheel drive shafts 9,9. The remaining driving force output from the continuously variable speed-changing device 6 is transmitted to a propeller shaft 11 for driving the rear wheels, a differential 12 for the rear wheels connected to the propeller shaft 11 for driving the rear wheels, right and left rear wheel drive shafts 13,13 on the output side of the differential 12 for the rear wheels and the rear wheels 14,14 attached to the rear wheel drive shafts 13,13. The front wheels 10,10 are steered as a driver turns a steering wheel 15.

A vehicle speed sensor 16 is disposed on the continuously variable speed-changing device 6 close to a gear on a power transmission passage to the rear wheels 14. The vehicle speed sensor 16 detects the rotational speed of the gear (corresponds to the vehicle speed V). A steering angle sensor 18 for detecting the steering angle of the steering wheel 15 detects the steering angle $\zeta$ of the front wheels 10,10, and sends an output to the controller 30.

The continuously variable speed-changing device 6 is further provided with a tilting angle sensor 19 for the front wheels to detect the true tilting angle φaf of the power rollers 42 for front wheels in the continuously variable speed-changing mechanism 6a for the front wheels that will be described later, and with a tilting angle sensor 20 for rear wheels to detect the true tilting angle φar of the power rollers 42 for rear wheels in the continuously variable speed-changing mechanism 6b for the rear wheels that will be described later. In order to control the movement of trunnions 43 of the continuously variable speed-changing mechanism 6a for the front wheels and of the continuously variable speed-changing mechanism 6b for the rear wheels that will be described later, there are arranged a hydraulic servo circuit 21 for the front wheels and a hydraulic servo circuit 22 for the rear wheels for the hydraulic cylinders (not shown) for actuating the trunnions 43 corresponding to the continuously variable speed-changing mechanisms 6a and 6b. As will be described later, the tilting angles of the power rollers 42 are defined according to the moving amounts of the trunnions 43. As will be described later in detail, the target tilting angles of the power rollers 42 in the continuously variable speed-changing mechanisms 6a and 6b correspond to the target speed-changing ratios of the continuously variable speed-changing mechanisms 6a and 6b. A detection signal from the tilting angle sensor 19 for the front wheels is input to the hydraulic servo circuit 21 for the front wheels, and a detection signal from the tilting angle sensor 20 for the rear wheels is input to the hydraulic servo circuit 22 for the rear wheels.

The controller 30 is equipped with a predetermined speed-changing map which comprises the accelerator pedal operation amount Ac such as an accelerator pedal-pushing amount of the four-wheel-drive vehicle 1, vehicle speed V and the engine rotational speed Ne. The accelerator pedal operation amount Ac can be detected by, for example, a potentiometer (not shown) that detects the amount of operation of the accelerator pedal. The vehicle speed can be detected by the vehicle speed sensor 16. Further, the engine rotational speed Ne can be detected by detecting the rotational speed of the flywheel of the engine 2 by using, for example, an engine rotational speed sensor that is not shown. These potentiometer, vehicle speed sensor 16 and engine rotational speed sensor constitute detector means for detecting the operation conditions of the vehicle, and detection signals obtained by the detector means are input to the controller 30.

In this embodiment, the controller 30 sets a target speed-changing ratio obtained based on the operation conditions of the vehicle detected by the detector means to be a target speed-changing ratio for the rear wheels (corresponds to a target tilting angle φcr for rear wheels) in the continuously variable speed-changing mechanism 6a for the rear wheels (sent the target speed-changing ratio as a target speed-changing ratio for the rear wheels to the hydraulic servo circuit 22 for the rear wheels), and adds an amount for correcting the speed-changing ratio (corresponds to an amount Δφ for correcting the tilting angle) which is a difference between the target speed-changing ratio and the target speed-changing ratio for the front wheels (corresponds to the target tilting φcf for the front wheels) in the continuously variable speed-changing mechanism 6b for the front wheels to the target speed-changing ratio to obtain a target speed-changing ratio for the front wheels (corresponds to the target tilting angle φcf for the front wheels) which is, then, set as the target speed-changing ratio for the front wheels (sent as the target speed-changing ratio for the front wheels to the hydraulic servo circuit 21 for the front wheels). The amount for correcting the speed-changing ratio is determined based on a tire diameter ratio of the front wheels 10 and the rear wheels 14. This will be described later. The hydraulic servo circuits 21 and 22 receive the target tilting angle φcf for the front wheels and the target tilting angle φcr for the rear wheels output from the controller 30, receive the true tilting angle φaf for the front wheels detected by the continuously variable speed-changing mechanism 6a for the front wheels and receive the true tilting angle φar for the rear wheels detected by the continuously variable speed-changing mechanism 6b for the rear wheels. In response to these input data, control signals Uf and Ur are output to the hydraulic servo circuits 21 and 22, thereby to control the hydraulic pressure of the hydraulic cylinders which are the actuators of the continuously variable speed-changing mechanism 6a and 6b, to control the displacement of the trunnions 43 in the direction of the tilting axis, to control the tilted angle of the power rollers 42, and to control the change of speed in the continuously variable speed-changing mechanisms 6a and 6b. Controlling the tilting angles of the continuously variable speed-changing mechanisms 6a and 6b by the controller 30 will be described later in detail.

When a certain steering angle ζ is given by the operation of the steering wheel 15, an amount of correction Δφs (see a correction circuit 31 in FIG. 1) calculated by the correction circuit 31 in response to the steering angle ζ is added to the amount for correcting the speed-changing ratio based on the tire diameter ratio to cope with a difference between the loci along which the rear wheels 14 travel and the loci along which the front wheels 10 travel. When the steering angle is brought to the opposite side, the graph becomes symmetrical with respect to the vertical axis of steering angle ζ=0 as shown in the correction circuit 31. Since in this invention, it is based on the assumption that the vehicle travels straight, the amount Δφ of correcting the tilting angle based on the steering angle ζ is not described in further detail.

Figure 2:
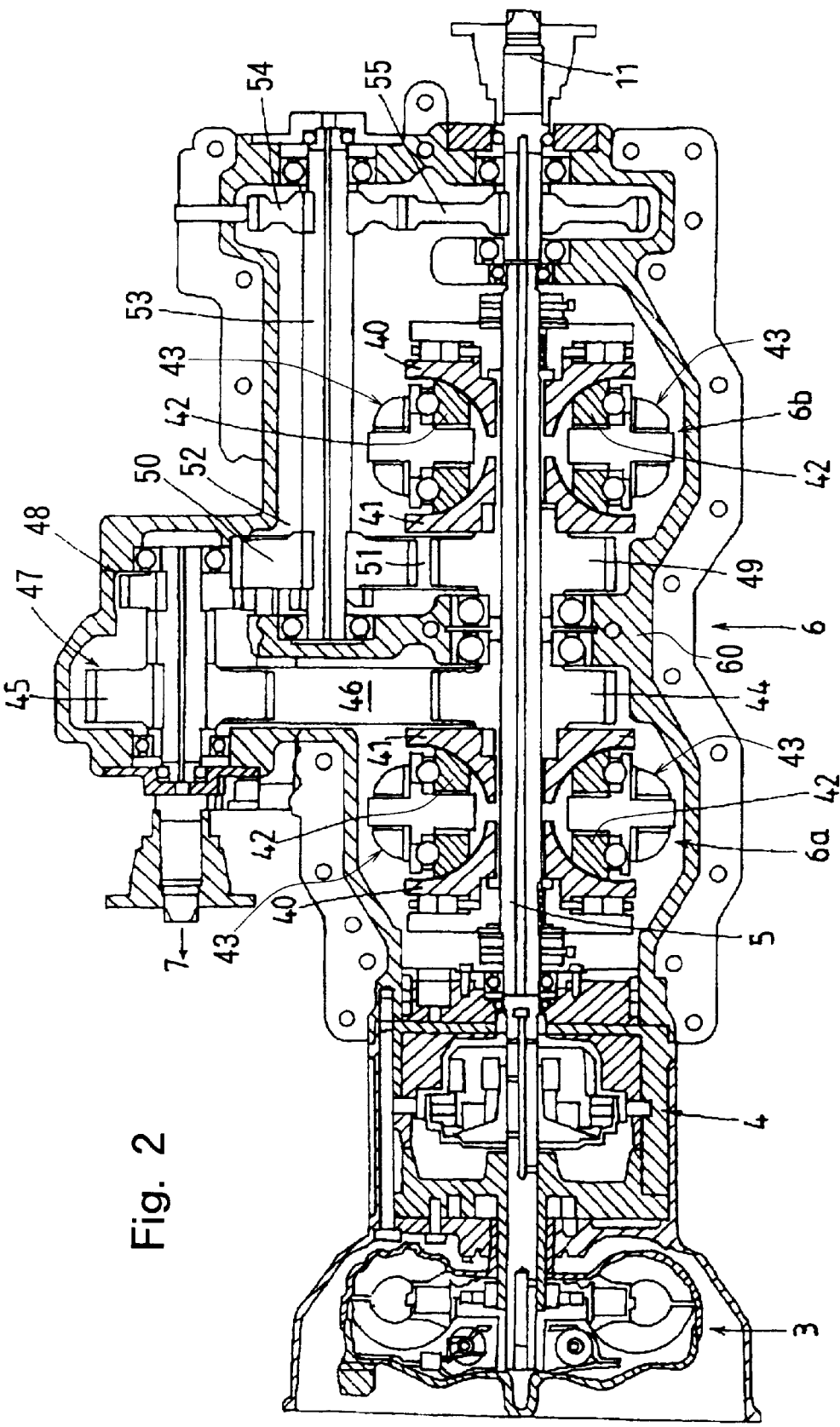
FIG. 2 is a vertical sectional view of the device for changing the speeds of the front and rear wheels of the four-wheel-drive vehicle shown in FIG. 1.

Next, the toroidal type continuously variable speed-changing device 6 will be described with reference to FIG. 2. In FIG. 2, the same constituent elements as those shown in FIG. 1 are denoted by the same reference numerals, and their description is not repeated. Referring to FIG. 2, the continuously variable speed-changing device 6 comprises a main shaft 5 supported by a casing 60, and the continuously variable speed-changing mechanism 6a for the front wheels and the continuously variable speed-changing mechanism 6b for the rear wheels 6b arranged, spaced apart, in the axial direction of the main shaft 5. The output from the engine 2 is input to the main shaft 5 from the torque converter 3 through the clutch unit 4. The continuously variable speed-changing mechanism 6a for the front wheels changes the input rotational speed of the main shaft 5 and outputs it to the front wheel drive shafts 9. Further, the continuously variable speed-changing mechanism 6b for the rear wheels changes the input rotational speed of the main shaft 5 and outputs it to the rear wheel drive shafts 13. The continuously variable speed-changing mechanisms 6a and 6b are controlled by the controller 30 so as to continuously vary the speeds of the front wheels 10, 10 and the rear wheels 14, 14 independently from each other.

The continuously variable speed-changing mechanism 6a for the front wheels and the continuously variable speed-changing mechanism 6b for the rear wheels are constituted substantially in the same manner. Therefore, the continuously variable speed-changing mechanism 6a for the front wheels will be briefly described. The continuously variable speed-changing mechanism 6a for the front wheels has an input disk 40 secured to the main shaft 5 and having one surface in the axial direction of the main shaft 5 formed as an input side recessed surface of an arcuate shape in cross section, and an output disk 41 having one surface in the axial direction of the main shaft 5 formed as an output side recessed surface of an arcuate shape in cross section. The output disk 41 is disposed so as to rotate relative to the main shaft 5 and to surround the outer peripheral surface of the main shaft 5, the output side recessed surface thereof being opposed to the input side recessed surface of the input disk 40 in the axial direction. A pair of power rollers 42 are disposed between the input side recessed surface of the input disk 40 and the output side recessed surface of the output disk 41 so as to freely rotate relative to the input disk 40 and the output disk 41. The axes of rotation of the power rollers 42 are disposed to meet at right angles with the axes of the trunnions 43 that will be described later. The power rollers 42 are so constituted as to possess spherical protruded surfaces along the periphery thereof, and the protruded surfaces come in pressed contact (point contact) with the input side recessed surface of the input disk 40 and with the output side recessed surface of the output disk 41.

The power rollers 42 are rotatably supported by the trunnions 43. The trunnions 43 are so supported as to rotate about the axes (axes in agreement with the tilting axis 55 shown in FIG. 3) relative to the casing 60 and to move in the axial direction. The axes of the trunnions 43 extend in parallel with each other in the tangential direction with respect to the main shaft 5 (front-and-back direction in FIG. 2) at symmetrical positions with the main shaft 5 sandwiched therebetween at an equal distance. The center of arc (not shown) of the input side recessed surface of the input disk 40 and the center of arc (not shown) of the output side recessed surface of the output disk 41 are arranged on a common center of arc on the cross section (cross section shown in FIG. 2) of the input disk 40 and the output disk 41 opposed to each other in the axial direction of the main shaft 5. Further, the axes of the trunnions 43 are so arranged as to be in agreement with the centers of the corresponding arcs. Further, the axes of the trunnions 43 define the tilting axis 55 (see FIG. 3) of the corresponding power rollers 42. By moving the trunnions 43 in the axial directions and in the opposite directions by the hydraulic cylinders (not shown) which are the actuators described earlier, the power rollers 42 are tilted on the tilting axis 55 by a tilting angle $\phi$ (see FIG. 3) corresponding to the moving amount of the trunnions 43. The contact points are varied between the power rollers 42 and the two disks 40 and 41 according to the tilted rotation of the power rollers 42, whereby the rotational speed of the input disk 40 is continuously varied and is transmitted to the output disk 41 to change the speed between the input disk 40 and the output disk 41. The continuously variable speed-changing device 6 including the thus constituted continuously variable speed-changing mechanism 6a for the front wheels and the continuously variable speed-changing mechanism 6b for the rear wheels, works to output the rotational forces of the output disks 41 of the continuously variable speed-changing mechanism 6a for the front wheels and of the continuously variable speed-changing mechanism 6b for the rear wheels to the front wheels 10,10 and to the rear wheels 14,14 independently from each other, to accomplish the full-time four-wheel drive. As will be obvious from the foregoing description, the continuously variable speed-changing mechanism 6a for the front wheels and the continuously variable speed-changing mechanism 6b for the rear wheels, constitute, single-cavity toroidal type continuously variable speed-changing mechanisms, respectively. Therefore, the continuously variable speed-changing device 6 constitutes a double-cavity toroidal type continuously variable speed-changing device.

In the continuously variable speed-changing mechanism 6a for the front wheels, the rotation of the output disk 41 is transmitted to the front right and left wheels 10,10 from the propeller shaft 7 for the front wheels through a chain transmission device 47 having sprockets 44 and 45 and a chain 46 and through a gear mechanism 48 having an idler gear for bringing the rotational direction into match with the rear wheels 14,14. The front wheel driving force is distributed to the front right and left wheels 10,10 in compliance with the rotational speeds that are different for the inner wheel and for the outer wheel in response to the steering angle $\zeta$ of the steering wheel 15 through the differential 8 for the front wheels coupled to the propeller shaft 7 for the front wheels. In the continuously variable speed-changing mechanism 6b for the rear wheels, the rotation of the output disk 41 is transmitted to the propeller shaft 11 for the rear wheels from a chain transmission device 52 having sprockets 49, 50 and a chain 51 through a gear 54 on a counter shaft 53 and a gear 55 on the propeller shaft 11 for the rear wheels arranged in concentric with the main shaft 5. The rotation of the propeller shaft 11 for the rear wheels is transmitted to the right and left rear wheels 14,14. The rear wheel driving force is distributed to the rear right and left wheels 14,14 in compliance with the rotational speeds that are different for the inner wheel and for the outer wheel through the differential 12 for the rear wheels coupled to the propeller shaft 11 for the rear wheels.

Referring to FIG. 1, in order to selectively change the driving state over to the four-wheel drive and to the two-wheel drive, the front wheel drive shafts 9 are provided with a clutch 35 for coupling the front right and rear wheels 10,10 together in such a manner that they can be disconnected. The clutch 35 which is a driving force disconnection device includes a spline and a sleeve that slides in a meshing direction relative to the spline to engage with the spline. A hydraulic cylinder 81 which is an actuator is disposed to disconnect the clutch 35 by actuating the sleeve. The hydraulic cylinder 81 is controlled by the controller 30. The four-wheel-drive vehicle 1 is provided with front wheel rotational speed sensors 91,91 for detecting the rotational speeds of the front wheel drive shafts 9,9 (i.e., rotational speeds of the front wheels 10,10) and rear wheel rotational speed sensors 131,131 for detecting the rotational speeds of the rear wheel drive shafts 13,13 (i.e., rotational speeds of the rear wheels 14,14). Detection signals of the front wheel rotational speed sensors 91,91 and of the rear wheel rotational speed sensors 131,131 are input to the controller 30 for controlling the speed of the continuously variable speed-changing device 6. In the four-wheel-drive state, rotations of the front wheels 10,10 and of the rear wheels 14,14 affect each other. When the vehicle is traveling straight, therefore, the controller 30 disconnects the clutch 35 so that the vehicle assumes the two-wheel-drive state, and obtains a ratio of tire diameters between the front wheels and the rear wheels based on average values of the values detected by the front wheel rotational speed sensors 91,91 and on average values of the values detected by the rear wheel rotational speed sensors 131,131.

If the rotational speeds of the front wheels and of the rear wheels are measured to be Nf and Nr while traveling straight in the two-wheel-drive state in which the tires slip little due to the driving force (desirably, traveling straight at a constant speed, but may be traveling straight in an accelerated state), then, the ratio (in terms of the rotational speed Nr of the rear wheels as a reference) α becomes the tire diameter ratio (ratio of the tire diameter of the front wheels to the tire diameter of the rear wheels), $$\alpha = Nf/Nr \tag{1}$$

Even when the tire diameters are not the same, inconvenience such as loss of power due to a difference in the rotational speed between the front wheels and the rear wheels when traveling, can be avoided provided the front wheels and the rear wheels have an equal peripheral velocity. Therefore, the four-wheel-drive vehicle 1 is allowed to travel smoothly if the tilting angles φ of the power rollers 42,42 in the continuously variable speed-changing mechanisms 6a and 6b are so controlled that the ratio of the speed-changing ratio ef of the continuously variable speed-changing mechanism 6a for the front wheels to the speed-changing ratio er of the continuously variable speed-changing ratio er of the continuously variable seed-changing mechanism 6b becomes equal to the rotational speed ratio α determined by the equation (1), as expressed by the following equation (2), $$ef/er = \alpha \tag{2}$$

In practice, there exists a nonlinear relationship between the speed-changing ratio and the tilting angle. In the half toroidal type continuously variable speed-changing device, however, the adjustment can be easily accomplished as described below.

The controller 30 sets the target speed-changing ratio obtained from the speed-changing map, based on the operation conditions of the vehicle detected by the detector means, to be the target speed-changing ratio ecr for the rear wheels in the continuously variable speed-changing mechanism 6b for the rear wheels. The controller 30 further adds an amount Δe for correcting the speed-changing ratio to the target speed-changing ratio ecr for the rear wheels in the continuously variable speed-changing mechanism 6b for the rear wheels, and sets the added result to be a target speed-changing ratio ecf for the front wheels in the continuously variable speed-changing mechanism 6a for the front wheels. More specifically, since the target speed-changing ratios correspond to the tilting angles of the power rollers 42 in the continuously variable speed-changing mechanisms 6a and 6b, the controller 30 sends, as an instruction tilting angle for the rear wheels, a target tilting angle φcr for the rear wheels corresponding to the target speed-changing ratio ecr for the rear wheels in the continuously variable speed-changing mechanism 6b for the rear wheels to the hydraulic servo circuit 22 for the rear wheels. The hydraulic servo circuit 22 for the rear wheels further receives the true tilting angle φar for the rear wheels detected by the continuously variable speed-changing mechanism 6b for the rear wheels. In response to these input data, the hydraulic servo circuit 22 for the rear wheels produces a control signal Ur to control the hydraulic pressure of the hydraulic cylinder in the continuously variable speed-changing mechanism 6b for the rear wheels, controls the displacement of the trunnions 43 in the direction of tilting axes in the continuously variable speed-changing mechanism 6b for the rear wheels to control the tilted angle of the power rollers 42, and brings the tilting angle of the power rollers 42 to the position of target tilting angle φcr for the rear wheels. The rear wheels 14,14 are rotatively driven substantially at the above target speed-changing ratio ecr for the rear wheels. The controller 30 further adds an amount Δφ for correcting the tilting angle to the target tilting angle φcr for the rear wheels, as expressed by the following equation (3), and sets the added result to be the target tilting angle φcf for the front wheels in the continuously variable speed-changing device 6a for the front wheels. More specifically, the controller 30 sends, as an instruction tilting angle for the front wheels, the target tilting angle φcf corresponding to the target speed-changing ratio ecf for the front wheels in the continuously variable speed-changing mechanism 6a for the front wheels to the hydraulic servo circuit 21 for the front wheels.

The hydraulic servo circuit 21 for the front wheels further receives the true tilting angle φaf for the front wheels detected by the continuously variable speed-changing mechanism 6a for the front wheels. In response to these input data, the hydraulic servo circuit 21 for the front wheels outputs the control signal Uf to control the hydraulic pressure of the hydraulic cylinder in the continuously variable speed-changing mechanism 6a for the front wheels, controls the displacement of the trunnions 43 in the direction of tilting axes in the continuously variable speed-changing mechanism 6a for the front wheels to control the tilted angle of the power rollers 42, and brings the tilting angle of the power rollers 42 to the position of the target tilting angle φcf for the front wheels. The front wheels 10,10 are rotatively driven substantially at the target speed-changing ratio ecf for the front wheels.

$$\phi cf = \phi cr + \Delta\phi \tag{3}$$

Figure 3:
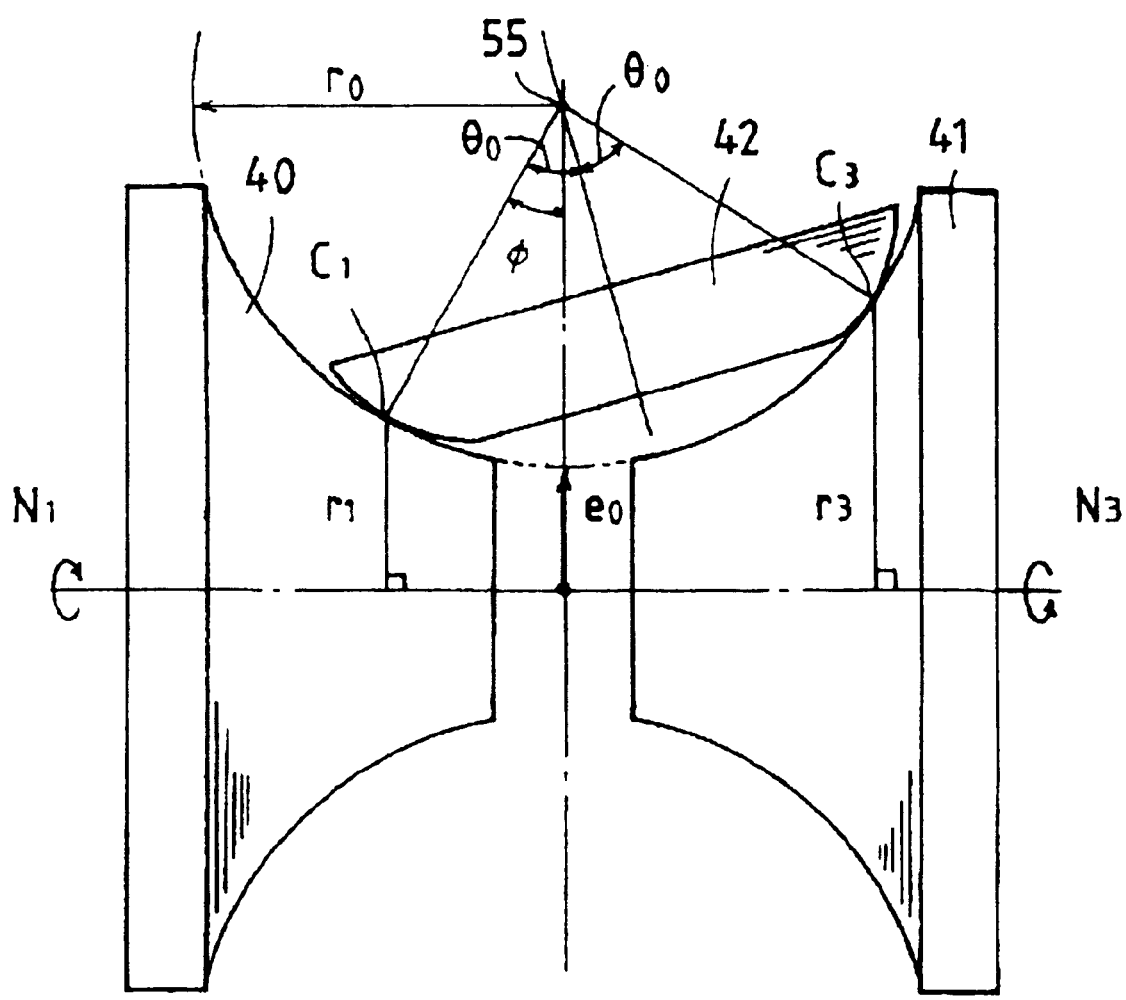
FIG. 3 is a diagram of the constitution of major portions for illustrating a relationship between the tilting angle $\phi$ of the power rollers and the rotational speed N3 of the output disk in the toroidal type continuously variable speed-changing device.
Figure 4:
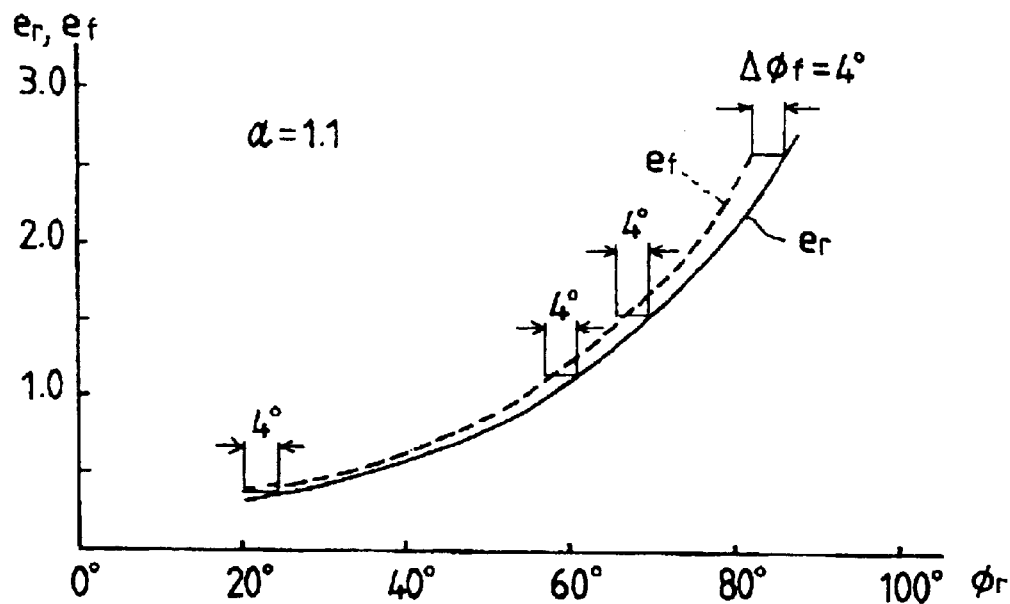
FIG. 4 is a graph illustrating a relationship between the tilting angle $\phi r$ in the continuously variable speed-changing mechanism for the rear wheels and the speed-changing ratio in the continuously variable speed-changing mechanism for the front wheels and in the continuously variable speed-changing mechanism for the rear wheels in the device for changing the speeds of the front and rear wheels with the tire diameter ratio as a reference according to the present invention.

The amount Δφ for correcting the tilting angle is so determined that the ratio of the speed-changing ratios becomes ef/er=α in a state where the speed is most decreased (e.g., in a state corresponding to the low gear where the tilting angle for the rear wheels is φr=20°). Referring, for example, to FIGS. 3 and 4, in the structure of the toroidal type continuously variable speed-changing mechanism having a cavity aspect ratio $k_0$ (=$e_0/r_0$, where $e_0$ is a virtual minimum diameter of the disk and $r_0$ is a half-toroidal radius of curvature)=0.45 and a half vertex angle $\theta_0$=57°, the amount for correcting the tilting angle is, $$\Delta\phi = 4° \tag{4}$$

for a tire diameter ratio of α=1.1 (the tire diameter of the front wheels is smaller than the tire diameter of the rear wheels by 10%).

When the tire diameter of the front wheels is smaller than the tire diameter of the rear wheels by 10%, the ratio ef/er of nearly 1.1 is maintained over the whole range of speed-changing ratios if the target tilting angle φcf of the power rollers 42 for the front wheels corresponding to the target speed-changing ratio ecf for the front wheels in the continuously variable speed-changing mechanism 6a for the front wheels, is shifted toward the speed-increasing side by only 4° in relation with the target tilting angle φcr of the power rollers 42 for the rear wheels, that corresponds to the target speed-changing ratio ecr for the rear wheels in the continuously variable speed-changing mechanism 6b for the rear wheels. The amount Δφ for correcting the tilting angle is determined by the cavity aspect ratio $k_0$ and the half vertical angle $\theta_0$, i.e., determined according to the structure of the toroidal type continuously variable speed-changing mechanism, and is stored as an initial value in the controller 30.

FIG. 4 is a graph illustrating changes in the speed-changing ratio ef for the front wheels and in the speed-changing ratio er for the rear wheels, wherein the abscissa represents the tilting angle φr of the power rollers 42 for the rear wheels (hereinafter simply referred to as tilting angle φr) in the continuously variable speed-changing mechanism 6b for the rear wheels. A solid line represents the speed-changing ratio er for the rear wheels and a broken line represents the speed-changing ratio ef for the front wheels when the tilting angle φr varies from 20° up to about 88°. As will be understood from FIG. 4, though the relationship is essentially nonlinear between the tilting angle φf for the front wheels (hereinafter simply referred to as tilting angle φf) corresponding to the speed-changing ratio ef for the front wheels and the tilting angle φr corresponding to the speed-changing ratio er for the rear wheels in order to obtain the ratio ef/er=1.1, it can be replaced by an approximation obtained by advancing the tilting angle φf for the front wheels toward the speed-increasing side by 4° in relation with the tilting angle φr for the rear wheels.

Figure 5:
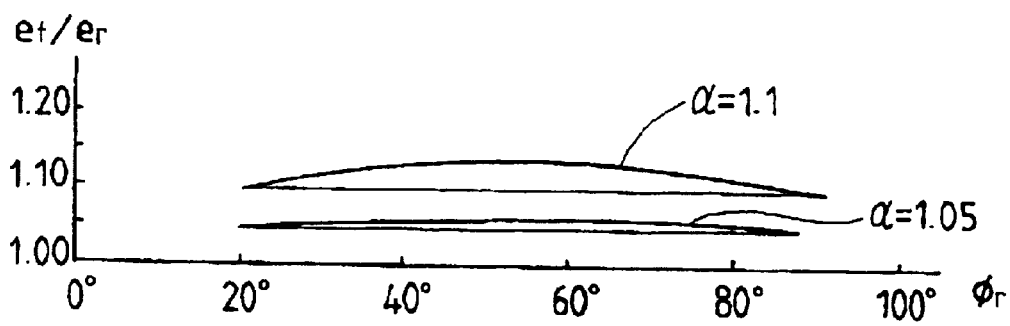
FIG. 5 is a graph illustrating a relationship between the tilting angle $\phi r$ in the continuously variable speed-changing mechanism for the rear wheels and the deviation of the ratio between the speed-changing ratio in the continuously variable speed-changing mechanism for the front wheels and the speed-changing ratio in the continuously variable speed-changing mechanism for the rear wheels in the device for changing the speeds of the front and rear wheels on the basis of the tire diameter ratio as a reference according to the present invention.

FIG. 5 is a graph illustrating a deviation from the true ratio (1.1 or 1.05) of the ratio (ef/er) of the speed-changing ratio ef for the front wheels to the speed-changing ratio er for the rear wheels when an approximation is set by advancing the tilting angle φf of the front wheels toward the speed-increasing side by 4° in relation with the tilting angle φr for the rear wheels, in the graph the abscissa representing the tilting angle φr of the power rollers 42 in the continuously variable speed-changing mechanism 6b for the rear wheels. The upper graph shows a deviation in the ratio (ef/er) of when the tire diameter ratio α is 1.1. In this control operation, the maximum error is at the most 2.7% ((ef/er)/α=1.13/1.1=1.027) when the speed-changing ratio is near 1 (corresponds to the tilting angle φr of about 57°).

Similarly, when the tire diameter ratio is α=1.05 (the tire diameter of the front wheels is smaller than the tire diameter of the rear wheels by 5%), the amount for correcting the tilting angle is, $$\Delta\phi=2° \quad (5)$$

As will be understood from the lower graph in FIG. 5, further, when the tire diameter ratio α=1.05, the maximum error from the theoretical value is 1.2% ((ef/er)/α=1.063/1.05=1.012) at the speed-changing ratio being nearly 1.

The toroidal type continuously variable speed-changing mechanism of the above-mentioned model (the cavity aspect ratio $k_0$ for defining the toroidal plane is 0.45, and the half vertical angle $θ_0$ is 57°) is practicable to a sufficient degree even when the amount Δφ for correcting the tilting angle is approximated to be 4° or 2° at the tire diameter ratio α is 1.1 or 1.05. For other tire diameter ratios α (usually, the tire diameter ratio α does not greatly deviate from these values), therefore, the amount for correction can be sufficiently approximated by using a primary function. That is, the amount Δφ for correcting the tilting angle can be expressed by the following approximate equation using the tire diameter ratio α only as a variable, $$\Delta\phi=4°\times(\alpha-1)\times10 \quad (6)$$

As for the toroidal speed-changing units having cavity aspect ratios $k_0$ and half vertical angles $θ_0$ of different values, the coefficient related to α of the equation (6) becomes a value different from 4° and can be stored in the map as an initial value corresponding to the model of the toroidal type continuously variable speed-changing mechanism. This method greatly facilitates the four-wheel-drive operation by the controller 30.

As will be understood from FIG. 5, some error occurs in the ratio (ef/er) of the speed-changing ratios in response to the tilting angle φr of the power rollers 42 in the continuously variable speed-changing mechanism 6b for the rear wheels. In order to eliminate this error, therefore, the amount Δφ for correcting the tilting angle may be further corrected in response to the magnitude of the tilting angle φr. By effecting the correction again, it becomes possible to more highly precisely avoid the inconvenience such as loss of power ascribed to a difference in the tire diameters during the four-wheel-drive traveling.

Next, described below with reference to FIG. 3 is a relationship between the tilting angle φ of the power rollers 42 and the rotational speed $N_3$ of the output shafts of the continuously variable speed-changing mechanisms 6a and 6b. In FIG. 3, when the rotational speeds of the input disk 40 and the output disk 41 are denoted by $N_1$ and $N_3$, the radii (contact radii) at the contact points $C_1$, $C_3$ of the input disk 40, output disk 41 and the power rollers 42 are denoted by $r_1$ and $r_3$, the shortest diameter between the main shaft 5 and the extension of a contact surface between the input disk 40 and the output disk 41 (extension of an arcuate surface of the two disks 40 and 41 shown in cross section in FIG. 3) is denoted by $e_o$, the angle between one contact point $C_1$, $C_3$ and an axially symmetrical surface between the two disks on the tilting axis 55 of the trunnions 43 (surface that passes through the axial center between the two disks 40 and 41 and through the tilting line 55 and is at right angles with the axes of the two disks 40 and 41 in FIG. 3) is regarded to be a tilting angle φ, one-half of a vertical angle between the tilting axis and the two contact points $C_1$ and $C_3$ is regarded to be a half vertical angle $θ_0$, a distance from the tilting axis 55 of the trunnions 43 to the contact points $C_1$, $C_3$ of the power rollers 42, i.e., the radius of curvature of the half toroidal is denoted by $r_0$, and a virtual minimum radius of the disk is denoted by $e_0$, there holds the following equation from the geometrical relationship, $$r_0 + e_0 = r_0 \cdot \cos\phi + r_1$$
$$= r_0 \cdot \cos(2\theta_0 - \phi) + r_3$$

On the other hand, the ratio of $r_1$ and $r_3$ is inversely proportional to the rotational speed of the input disk 40 and the output disk 41 through the rotation of the power rollers 42 as an intermediary rotation. From the ratio of $r_1$ and $r_3$, the speed-changing ratio e that is a ratio of the rotational speed $N_3$ of the output disk 41 to the rotational speed $N_1$ of the input disk 40, can be obtained in compliance with the following equation (3). Here, in this specification, the speed-changing ratio is a value obtained by dividing the output rotational speed by the input rotational speed.

$$e = N_3/N_1 = r_1/r_3 \quad (7)$$
$$= (1 + k_0 - \cos\phi)/[(1 + k_0 - \cos(2\theta_0 - \phi)]$$

where $k_0$ is a value representing a geometrical feature of the cavity and is called cavity aspect ratio (=$e_0/r_0$) as described earlier.

Next, described below is a relationship between the tilting angle φf of the power rollers 42 in the continuously variable speed-changing mechanism 6a for the front wheels and the tilting angle φr of the power rollers 42 in the continuously variable speed-changing mechanism 6b for the rear wheels. If the rotational speeds of the front wheels 10 and of the rear wheels 14 are denoted by Nf and Nr, then, α=Nf/Nr from the equation (1) when the tire diameter ratio is being corrected. The reduction ratio of the output disk 41 of the continuously variable speed-changing mechanism 6a for the front wheels to the front wheels 10 is generally equal to the reduction ratio of the output disk 41 of the continuously variable speed-changing mechanism 6b for the rear wheels to the rear wheels 14. Therefore, if the rotational speeds of the output disks 41 of the continuously variable speed-changing mechanism 6a for the front wheels and of the continuously variable speed-changing mechanism 6b for the rear wheels are denoted by $Nf_3$ and $Nr_3$, the ratio ($Nf_3/Nr_3$) becomes equal to $\alpha$.

The input rotational speeds of the continuously variable speed-changing mechanisms 6a and 6b for the front and rear wheels are the rotational speed of the main shaft 5 and assume the same value. If tilting angles $\phi f$ and $\phi r$ of the power rollers 42,42 of the continuously variable speed-changing mechanisms 6a and 6b are used for the equation (7), therefore, there hold the following equations, $$ef = Nf_3/N_1 = (1 + k_0 - \cos\phi f)/ \quad (8)$$
$$[(1 + k_0 - \cos(2\theta_0 - \phi f)]$$
$$er = Nr_3/N_1 = (1 + k_0 - \cos\phi r)/$$
$$[(1 + k_0 - \cos(2\theta_0 - \phi r)]$$

From the ratio of the above two, the following equation holds, $$ef/er = Nf_3/Nr_3 = \alpha \quad (9)$$
$$= \{(1 + k_0 - \cos\phi f)/[(1 + k_0 - \cos(2\theta_0 - \phi f)]\}/$$
$$\{(1 + k_0 - \cos\phi r)/[(1 + k_0 - \cos(2\theta_0 - \phi r)]\}$$

The speed-changing ratio er of the equation (8) is a function of the tilting angle $\phi r$ of the power rollers 42 in the continuously variable speed-changing mechanism 6b for the rear wheels. The tilting angle $\phi f$ is obtained by substituting the value of the tire diameter ratio $\alpha$ and the value of the tilting angle $\phi r$ for the equation (9). It is also allowable to store in advance the tilting angle $\phi f$ for each tilting angle $\phi r$ in the form of a map (see FIG. 4). As will be obvious from the foregoing description, the tilting angle $\phi f$ of the power rollers 42 of the continuously variable speed-changing mechanism 6a for the front wheels corresponds to the speed-changing ratio ef of the continuously variable speed-changing mechanism 6a for the front wheels, and the tilting angle $\phi r$ of the power rollers 42 of the continuously variable speed-changing mechanism 6b for the rear wheels corresponds to the speed-changing ratio er of the continuously variable speed-changing mechanism 6b for the rear wheels. In other words, the speed-changing ratio ef of the continuously variable speed-changing mechanism 6a for the front wheels can be replaced by the tilting angle $\phi f$ of the power rollers 42 of the continuously variable speed-changing mechanism 6a for the front wheels, and the speed-changing ratio er of the continuously variable speed-changing mechanism 6b for the rear wheels can be replaced by the tilting angle $\phi r$ of the power rollers 42 of the continuously variable speed-changing mechanism 6b for the rear wheels. Further, the tilting angle $\phi r$ can be replaced by the target tilting angle $\phi cr$ for the rear wheels, and the tilting angle $\phi f$ can be replaced by the target tilting angle $\phi cf$ for the front wheels.

When the vehicle is stably traveling straight at a constant speed and the tires slip little, the controller 30 disconnects the clutch 35 which is the driving power disconnection device, and calculates the tire diameter ratio $\alpha$ in a state where the vehicle travels in the two-wheel-drive state. The tire diameter ratio $\alpha$ is calculated from a ratio of the average values of the rotational speeds of the front wheel drive shafts 9,9 detected by the front wheel rotational speed sensors 91,91 to the average values of the rotational speeds of the rear wheel drive shafts 13,13 detected by the rear wheel rotational speed sensors 131,131. Due to this calculation, the tire diameter ratio $\alpha$ can be relatively easily and reliably obtained. It is also possible to obtain the tire diameter ratio $\alpha$ from a difference in the reaction forces obtained by measuring them in the hydraulic servo circuits 21 and 22 of the continuously variable speed-changing mechanisms 6a and 6b without providing the clutch 35. In this case, the four-wheel-drive vehicle is constituted more simply, making it possible to decrease the weight and the cost. The controller 30 further sets the target speed-changing operation conditions of the vehicle detected by the detector means to be the target speed-changing ratio ecr for the rear wheels in the continuously variable speed-changing mechanism 6b for the rear wheels (this has been specifically described already and is, hence, not repeated here again). The rear wheels 14,14 are substantially rotatively driven at the target speed-changing ratio (=target speed-changing ratio for the rear wheels).

The controller 30 further sets the target speed-changing ratio obtained based on the operation conditions of the vehicle detected by the detector means to be the target speed-changing ratio ecr for the rear wheels in the continuously variable speed-changing mechanism 6b for the rear wheels, and sets the speed-changing ratio obtained by correcting the target speed-charging ratio on the basis of the tire diameter ratio $\alpha$ to be the target speed-changing ratio ecf for the front wheels. As described earlier in this embodiment, the controller 30 adds the amount $\Delta\phi$ for correcting the tilting angle which is the amount for correcting the speed-changing ratio obtained based on the tire diameter ratio $\alpha$ to the target tilting angle $\phi cr$ for the rear wheels, and sets the result to be the target tilting angle $\phi cf$ for the front wheels, i.e., to be the target speed-changing ratio ecf for the front wheels in the continuously variable speed-changing device 6a for the front wheels. The controller 30, then, connects the clutch 35 to change the two-wheel-drive state over to the four-wheel-drive state. The front wheels 10,10 are rotatively driven at substantially the target speed-changing ratio ecf for the front wheels.

That is, when the tire diameter has changed between the front wheels and the rear wheels, the target speed-changing ratio ecf for the front wheels is corrected based on the tire diameter ratio $\alpha$ on the basis of the target speed-changing ratio ecr set to the continuously variable speed-changing mechanism 6b for the rear wheels as a reference, so that the peripheral velocities of the front wheels 10,10 are brought into agreement with the peripheral velocities of the rear wheels 14,14. As a result, loss of power ascribed to the difference in the peripheral velocity is eliminated, and a smooth four-wheel-drive traveling is realized. When the tire diameter (average value) of the front wheels 10 has decreased, the speed-changing ratio for the front wheels 10 is brought to the speed-increasing side to rotate the front wheels at a higher speed thereby to eliminate a difference in the peripheral velocity from the rear wheels 14, by utilizing the fact that the speed-changing ratio can be controlled for the front wheels 10 only. Conversely, when the tire diameter (average value) of the front wheels 10 has increased, the speed-changing ratio for the front wheels 10 is brought to the speed-decreasing side by utilizing the fact that the speed-changing ratio can be controlled for the front wheels 10 only, to rotate the front wheels at a lower speed thereby to eliminate a difference in the peripheral velocity from the rear wheels 14. It needs not be pointed out that when the tire diameter (average value) of the front wheels 10 has decreased, the amount $\Delta\phi$ for correcting the tilting angle added to the target tilting angle $\phi$cr for the rear wheels assumes a positive value and when the tire diameter (average value) of the front wheels 10 has increased, the amount $\Delta\phi$ for correcting the tilting angle added to the target tilting angle $\phi$cr for the rear wheels assumes a negative value. In the above-mentioned embodiment, the controller 30 is so constituted as to obtain the target speed-changing ratio for the front wheels by adding the amount for correcting the speed-changing ratio calculated based on the tire diameter ratio $\alpha$ to the target speed-changing ratio. Upon executing a relatively simple control operation, therefore, inconvenience such as loss of power caused by a difference in the tire diameter between the front wheels and the rear wheels is avoided, and a smooth four-wheel-drive traveling is realized. Besides, since the correction for obtaining the target speed-changing ratio for the front wheels is effected by adding the amount for correcting the speed-changing ratio calculated based on the tire diameter ratio to the target speed-changing ratio for the rear wheels, the speed-changing ratio is simply operated by the controller, the operation time is short, and the CPU and the memory need bear a decreased amount of burden.

According to the device for changing the speeds of the front and rear wheels in a four-wheel drive vehicle of the present invention as will be obvious from the foregoing description, the controller 30 calculates the tire diameter ratio $\alpha$ of the front wheels 10 to the rear wheels 14 during the vehicle travels straight, sets the target speed-changing ratio obtained based on the operation conditions of the vehicles detected by the detector means to be the target speed-changing ratio for the rear wheels in the continuously variable speed-changing mechanism 6b for the rear wheels, and sets the speed-changing ratio obtained by correcting the target speed-changing ratio on the basis of the tire diameter ratio $\alpha$ to be the target speed-changing ratio for the front wheels in the continuously variable speed-changing mechanism 6a for the front wheels. Consequently, inconvenience such as loss of power caused by the difference in the tire diameter between the front wheels and the rear wheels is avoided and a smooth four-wheel-drive traveling is realized. Further, the controller 30 detects changes in the tire diameters of the front and rear wheels during traveling straight and, when a difference is detected in the tire diameter between the front wheels and the rear wheels, the controller 30 separately controls the speed-changing ratios for the front and rear wheels in response to the difference so that the front and rear wheels will have an equal peripheral velocity, to thereby avoid inconvenience such as loss of power and realize a smooth four-wheel-drive traveling. Upon executing a relatively simple control operation, further, inconvenience such as loss of power caused by a difference in the tire diameter between the front wheels and the rear wheels is avoided, and a smooth four-wheel-drive traveling is realized.

In the above-mentioned embodiment, the target speed-changing ratio is set to be the target speed-changing ratio for the rear wheels in the continuously variable speed-changing mechanism 6b for the rear wheels, and the speed-changing ratio obtained by correcting the target speed-changing ratio based on the tire diameter ratio $\alpha$ is set to be the target speed-changing ratio for the front wheels in the continuously variable speed-changing mechanism 6a for the front wheels. However, there also holds another embodiment in which the target speed-changing ratio is set to be the target speed-changing ratio for the front wheels in the continuously variable speed-changing mechanism 6a for the front wheels, and the speed-changing ratio obtained by correcting the target speed-changing ratio based on the tire diameter ratio $\alpha$ is set to be the target speed-changing ratio for the rear wheels in the continuously variable speed-changing mechanism 6b for the rear wheels. This embodiment, too, makes it possible to obtain the actions and effects substantially the same as those in the earlier-mentioned embodiment.

According to the present invention, the controller 30 is capable of setting a speed-changing ratio obtained by correcting the target speed-changing ratio according to the predetermined equation using the target speed changing ratio and the tire diameter ratio $\alpha$ as variables, to be the target speed-changing ratio for the front wheels or the target speed-changing ratio for the rear wheels. Specifically, the above equation (9) is stored in the controller 30, and the speed-changing ratio to be set as the target speed-changing ratio for the front wheels or as the target speed-changing ratio for the rear wheels is calculated from the target speed-changing ratio and the tire diameter ratio $\alpha$ in accordance with the equation (9). Therefore, the above-mentioned control operation is easily and correctly executed.

According to the present invention, further, the controller 30 obtains the target speed-changing ratio for the front wheels or the target speed-changing ratio for the rear wheels by adding the amount for correcting the speed-changing ratio calculated based on the tire diameter ratio $\alpha$ to the target speed-changing. The actions and effects of this control operation are as described in detail in the foregoing embodiment.

According to the present invention, further, the controller 30 can calculate the amount for correcting the speed-changing ratio in accordance with the predetermined equation or the approximate equation using the tire diameter ratio $\alpha$ as a variable. The amount for correcting the speed-changing ratio that is the difference between the target speed-changing ratio for the front wheels and the target speed-changing ratio for the rear wheels, can be easily operated from the above equation (9). Further, by using the approximate equations, i.e., $$\phi cf = \phi cr + \Delta\phi \tag{3}$$

and $$\Delta\phi = 4° \times (\alpha - 1) \times 10 \tag{6}$$

$\Delta\phi$ can be easily calculated and, hence, $\phi$cf can be very easily calculated. It needs not be pointed out that $\Delta\phi$ assumes either a positive value or a negative value depending upon the value of the tire diameter ratio $\Delta$. It also needs not be pointed out that the equation for obtaining $\phi$cr by adding $\Delta\phi$ to $\phi$cf which is a reference is expressed by $\phi cr = \phi cf + \Delta\phi$.

According to the present invention, further, the controller 30 can obtain the amount for correcting the speed-changing ratio from a map prepared in advance based on the values calculated or approximated by the predetermined equation or approximate equation determined in advance by using the tire diameter ratio $\alpha$ as a variable. The map is as explained with reference to FIG. 4, and from the map, there can be very easily obtained the amount for correcting the speed-changing ratio, corresponding to the tire diameter ratio. The map is prepared in advance based on the approximate values for correcting the speed-changing ratios calculated from the approximate equation. The amounts for correcting the speed-changing ratios obtained by the approximate equation lie within a narrow range for the target speed-changing ratios for the rear wheels based on the tire diameter ratios $\alpha$ that are considered to take place and on the operation conditions and can, hence, be approximated by using a simple approximate function. The speeds for the front and rear wheels can be favorably controlled also by correcting the target speed-changing ratio for the rear wheels or the target speed-changing ratio for the front wheels based on the amount for correcting the speed-changing ratio obtained in accordance with the approximate function, and by setting the thus obtained speed-changing ratio to be the target speed-changing ratio for the front wheels or to be the target speed-changing ratio for the rear wheels. It is further allowable to form a map by making a graph by correctly plotting the ratios of ef to er in accordance with the equation (9) in FIG. 4.

According to the present invention, further, the controller 30 can obtain an approximate amount for correcting the speed-changing ratio calculated according to a predetermined approximate equation using the tire diameter ratio as a variable from a map prepared in advance by using approximate values that have been further corrected based on a deviation of the ratio of the target speed-changing ratio for the front wheels to the target speed-changing ratio for the rear wheels at the above tire diameter ratio. This deviation is as described with reference to FIGS. 4 and 5. The difference in the peripheral velocity between the front wheels and the rear wheels can be more reliably eliminated by further correcting the amount for correcting the speed-changing ratio calculated from the map or the approximate function, based on the tire diameter ratio α.

According to the present invention, further, the continuously variable speed-changing mechanism 6a for the front wheels and the continuously variable speed-changing mechanism 6b for the rear wheels are, respectively, constituted by a toroidal type continuously variable speed-changing device 6 comprising an input disk 40 which receives the driving force, an output disk 41 that is arranged opposite to the input disk 40 and is drive-coupled to the front wheel drive shafts 9,9 or to the rear wheel drive shafts 13,13, and power rollers 42 arranged between the input disk 40 and the output disk 41 so as to rotate in a tilted manner and to continuously change the rotational speed of the input disk 40 and transmit it to the output disk 41 by changing the contact points to the input disk 40 and to the output disk 41. The thus constituted toroidal type continuously variable speed-changing device 6 can transmit a large torque compared with the belt-type continuously variable speed-changing device and is, further, capable of quickly changing the speed, contributing to easily changing the speed by the controller 30.

According to the present invention, further, the controller 30 sets the target tilting angle φcf of the power rollers 42 for the front wheels in the continuously variable speed-changing mechanism 6a for the front wheels and the target tilting angle φcr of the power rollers 42 for the rear wheels in the continuously variable speed-changing mechanism 6b for the rear wheels, correspondingly to the target speed-changing ratio for the front wheels and to the target speed-changing ratio for the rear wheels. The controller 30 then controls the continuously variable speed-changing mechanism 6a for the front wheels and the continuously variable speed-changing mechanism 6b for the rear wheels, based on the target tilting angle φcf for the front wheels and on the target tilting angle φcr for the rear wheels. Upon executing a relatively simple control operation, therefore, the controller 30 avoids the inconvenience such as loss of power caused by a difference in the tire diameter between the front wheels and the rear wheels, and realizes a smooth four-wheel-drive traveling.

In the toroidal type continuously variable speed-changing device 6, the power rollers 42 are rotatably supported by the trunnions 43 which can be moved in the directions of tilted axes by the actuators. The controller 30 controls the operation of the actuators in the continuously variable speed-changing mechanism 6a for the front wheels and in the continuously variable speed-changing mechanism 6b for the rear wheels, based on a deviation between the target speed-changing ratio for the front wheels or the target speed-changing ratio for the rear wheels and the true speed-changing ratio for the front wheels or the true speed-changing ratio for the rear wheels calculated based on the rotation of the output disk 41, thereby to control the tilting angle of the power rollers 42 by feedback. This control operation makes it possible to avoid inconvenience such as loss of power caused by a difference in the tire diameter between the front wheels and the rear wheels and to realize a smooth four-wheel-drive traveling.

In response to the target speed-changing ratio for the front wheels and the target speed-changing ratio for the rear wheels, the controller 30 sets the target tilting angle φcf of the power rollers 42 for the front wheels in the continuously variable speed-changing mechanism 6a for the front wheels or the target tilting angle φcr of the power rollers 42 for the rear wheels in the continuously variable speed-changing mechanism 6b for the rear wheels, respectively, and further controls the continuously variable speed-changing mechanism 6a for the front wheels and the continuously variable speed-changing mechanism 6b for the rear wheels based on the target tilting angle φcf for the front wheels and the target tilting angle φcr for the rear wheels. When the tilting angle is to be controlled by feedback, the operation of the actuator is controlled based on the deviation between the target tilting angle and the actually detected tilting angle so that the deviation is canceled. This control operation makes it possible to avoid inconvenience such as loss of power caused by a difference in the tire diameter between the front wheels and the rear wheels and to realize a smooth four-wheel-drive traveling.

The present invention can be preferably put into practice as a device for changing the speeds of the front and rear wheels in a four-wheel-drive vehicle capable of variably driving the front wheels and the rear wheels independently from each other by using the toroidal type continuously variable speed-changing device. The invention can be preferably put into practice also as a device for changing the speeds of the front and rear wheels in a four-wheel-drive vehicle capable of variably driving the front wheels and the rear wheels independently from each other by using the belt-type continuously variable speed-changing device. In the above-mentioned embodiment, the clutch 35 which is the driving force disconnection device is provided for the front wheel drive shafts 9. However, the clutch 35 may be provided for the rear wheel drive shafts 13, instead.

What we claim is:

1. A device for changing the speeds of the front and rear wheels in a four-wheel-drive vehicle, which is equipped with a continuously variable speed-changing mechanism for the front wheels which changes the input rotational speed and outputs it to the front wheel drive shafts, and a continuously variable speed-changing mechanism for the rear wheels which changes the input rotational speed and outputs it to the rear wheel drive shafts, so that the front wheels and the rear wheels can be driven at continuously variable speeds independently of each other owing to the continuously variable speed-changing mechanisms, wherein:

said device for changing the speeds of the front and rear wheels comprises a detector means for detecting the operation conditions of the vehicle and a controller for variably controlling the speeds of said continuously variable speed-changing mechanism for the front wheels and of said continuously variable speed-changing mechanism for the rear wheels based on the operation conditions of the vehicle detected by said detector means; and said controller calculates a tire diameter ratio of the front wheels to the rear wheels during the vehicle travels straight, sets a target speed-changing ratio obtained based on the vehicle operation conditions detected by the detector means to be a target speed-changing ratio for the rear wheels in the continuously variable speed-changing mechanism for the rear wheels or to be a target speed-changing ratio for the front wheels in the continuously variable speed-changing mechanism for the front wheels, and sets a speed-changing ratio obtained by correcting the target speed-changing ratio based on the tire diameter ratio to be a target speed-changing ratio for the front wheels or to be a target speed-changing ratio for the rear wheels.

2. A device for changing the speeds of the front and rear wheels in a four-wheel-drive vehicle according to claim 1, wherein a driving force disconnection device is provided to disconnect the driving force transmitted to the front wheels from the continuously variable speed-changing mechanism for the front wheels or to disconnect the driving force transmitted to the rear wheels from the continuously variable speed-changing mechanism for the rear wheels, and the controller calculates the tire diameter ratio in a state where the driving force disconnection device is disconnected.

3. A device for changing the speeds of the front and rear wheels in a four-wheel-drive vehicle according to claim 1, wherein the controller calculates said tire diameter ratio from a ratio of the rotational speed of the front wheel drive shafts to the rotational speed of the rear wheel drive shafts.

4. A device for changing the speeds of the front and rear wheels in a four-wheel-drive vehicle according to claim 1, wherein the controller sets the speed-changing ratio obtained by correcting the target speed-changing ratio according to a predetermined equation using the target speed-changing ratio and the tire diameter ratio as variables to be the target speed-changing ratio for the front wheels or the target speed-changing ratio for the rear wheels.

5. A device for changing the speeds of the front and rear wheels in a four-wheel-drive vehicle according to claim 1, wherein the controller obtains said target speed-changing ratio for the front wheels or said target speed-changing ratio for the rear wheels by adding an amount for correcting the speed-changing ratio calculated based on the tire diameter ratio to the target speed-changing ratio.

6. A device for changing the speeds of the front and rear wheels in a four-wheel-drive vehicle according to claim 5, wherein the controller calculates said amount for correcting the speed-changing ratio in compliance with a predetermined equation or an approximate equation using the tire diameter ratio as a variable.

7. A device for changing the speeds of the front and rear wheels in a four-wheel-drive vehicle according to claim 5, wherein the controller obtains said amount for correcting the speed-changing ratio from a map prepared in advance based on the values calculated or approximated by a predetermined equation or an approximate equation determined in advance by using the tire diameter ratio as a variable.

8. A device for changing the speeds of the front and rear wheels in a four-wheel-drive vehicle according to claim 5, wherein the controller obtains said approximate amount for correcting the speed-changing ratio calculated by a predetermined approximate equation using the tire diameter ratio as a variable, from a map prepared in advance based on the approximate values which have been further corrected based on a deviation of the ratio between the target speed-changing ratio for the front wheels and the target speed-changing ratio for the rear wheels at said tire diameter ratio.

9. A device for changing the speeds of the front and rear wheels in a four-wheel-drive vehicle according to claim 1, wherein each of the continuously variable speed-changing mechanism for the front wheels and the continuously variable speed-changing mechanism for the rear wheels is constituted by a toroidal type continuously variable speed-changing device comprising an input disk for receiving a driving force, an output disk that is disposed being opposed to the input disk and is drive-coupled to the front wheel drive shafts or to the rear wheel drive shafts, and power rollers disposed between the input disk and the output disk so as to rotate in a tilted manner and to change contact points to the input disk and to the output disk to continuously change the rotational speed of the input disk and to transmit the rotation to the output disk.

10. A device for changing the speeds of the front and rear wheels in a four-wheel-drive vehicle according to claim 9, wherein the controller sets a target tilting angle of the power rollers for the front wheels in the continuously variable speed-changing mechanism for the front wheels and a target tilting angle of the power rollers for the rear wheels in the continuously variable speed-changing mechanism for the rear wheels, respectively, correspondingly to the target speed-changing ratio for the front wheels and the target speed-changing ratio for the rear wheels, to control the continuously variable speed-changing mechanism for the front wheels and the continuously variable speed-changing mechanism for the rear wheels based on the target tilting angle for the front wheels and the target tilting angle for the rear wheels.

\* \* \* \* \*